H. GUILD.
GAS CONDENSER.
No. 25,566.            Patented Sept. 27, 1859.
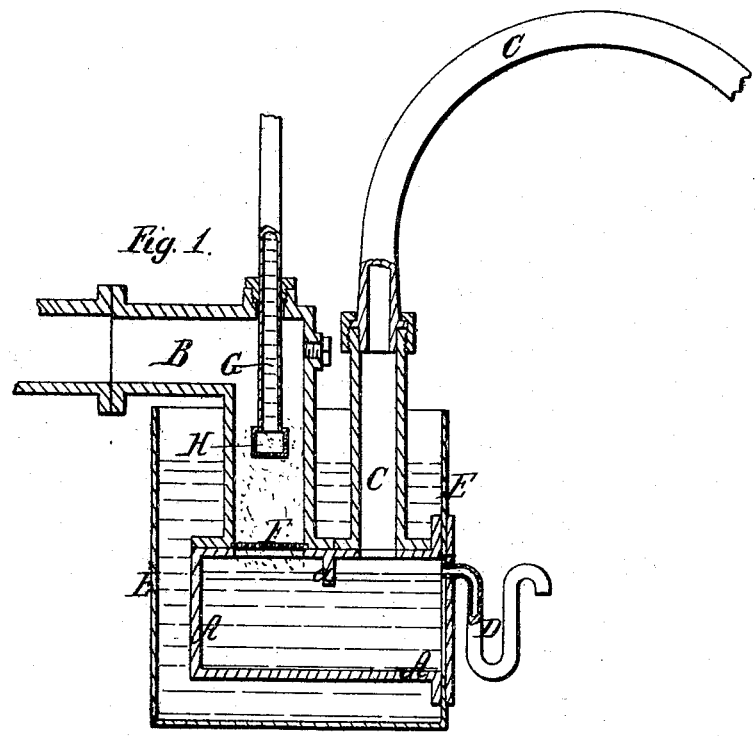
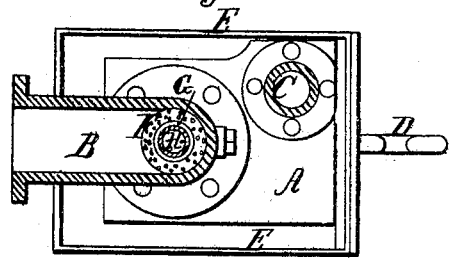
Witnesses;
Inventor,

UNITED STATES PATENT OFFICE.

HARVEY GUILD, OF NEW ORLEANS, LOUISIANA.

APPARATUS FOR WASHING GAS.

Specification of Letters Patent No. 25,566, dated September 27, 1859.

*To all whom it may concern:*

Be it known that I, HARVEY GUILD, of the city of New Orleans, in the parish of Orleans and State of Louisiana, have invented a new and useful Improvement in Condensers for Purifying Illuminating-Gas; and I do hereby declare that the following is a full, clear, and exact description of the same, reference being had to the accompanying drawings, forming a part of this specification, in which—

Figure 1 is a vertical section of a gas condenser with my improvement. Fig. 2, is a horizontal section of the same.

Similar letters of reference indicate corresponding parts in both figures.

My invention consists in a certain arrangement of a water pipe and rose within the inlet pipe of the gas condenser, in combination with a perforated plate at the junction of the inlet pipe of the wash box, whereby the gas is brought into very intimate contact with showers of water and caused to pass through small holes, along with the water, and the gas is caused to be presented to the action of very extensive and constantly changing surfaces of water, and very perfectly washed and purified.

To enable those skilled in the art to make and use my invention I will proceed to describe its construction and operation.

A is the wash box of the condenser, consisting of a close box having the inlet pipe B, leading from the retort and the outlet pipe C, leading to the gasometer, both connected at the top; and between these pipes there is a curtain plate *a*, extending all across the top and dipping into the water contained in the box to compel the gas to pass through the water on its way from the inlet to the outlet pipe. Two or more of these curtain plates may be used.

D is the overflow pipe for water and tar, keeping the water at a proper level in the box.

E is a tank in which the box A is placed, said tank being kept constantly supplied with fresh cold water for the purpose of keeping the said box A cool.

F is a perforated or reticulated diaphragm fitted to the inlet pipe B, at its connection with the wash box. The inlet pipe B is of elbow shape, and it is entered at the top by an upright pipe G, at the bottom of which is a rose H. A constant supply of water is admitted to this pipe G, and falls in a spray like shower from the rose H, through the inlet pipe and on to the diaphragm F, through which it again falls in a shower into the wash box.

The gas, on its way through the inlet pipe coming in contact with the spray like shower of water from the rose, receives its first washing and has much of its tar condensed before its arrival at the diaphragm F, and in passing through the perforations or interstices, along with the water, it is subjected to a scrubbing operation, after which it is subjected to the action of the second shower from the diaphragm, and finally again washed by passing through the body of water in the box A.

I do not claim broadly the washing of gas by causing it to pass through a shower or showers of water, or through perforated or reticulated diaphragms along with water, but

What I claim as my invention and desire to secure by Letters Patent, is:—

The arrangement of the water pipe G, and rose H, within the inlet pipe of the wash box A, in combination with the perforated plate or diaphragm F, at the junction of the inlet pipe with the wash box, substantially as herein described.

HARVEY GUILD.

Witnesses:
E. Y. HASLAM,
CORNELIUS SULLIVAN.